Nov. 23, 1965 J. ELIADES 3,219,835

MAGNETIC LOGIC SYSTEM

Filed March 13, 1961 2 Sheets-Sheet 1

INVENTOR
JAMES ELIADES
BY HIS ATTORNEYS
HARRIS, KIECH, RUSSELL & KERN

INVENTOR
JAMES ELIADES
BY HIS ATTORNEYS
HARRIS, KIECH, RUSSELL & KERN 3,219,835
MAGNETIC LOGIC SYSTEM

James Eliades, Fullerton, Calif., assignor, by mesne assignments, to Raytheon Company, a corporation of Delaware Filed Mar. 13, 1961, Ser. No. 95,248
17 Claims. (Cl. 307—88)

This invention relates to magnetic logic systems and, in particular, to a digital logic system in which the gating and storage functions are combined in single magnetic elements.

A digital logic system consists of decision elements and storage elements. Input information is passed through gating or decision networks and then set into storage elements, ordinarily in the form of flip-flops. The information from the storage elements is then used as the inputs to subsequent gating networks. Various combinations of diodes, resistors, and transistors are used to provide conventional gating and storage configurations.

It is an object of the invention to provide a new form of digital logic system which comprises a plurality of magnetic logic gate elements and utilizes the flux storage properties of the magnetic elements to eliminate the requirement of separate gating elements and storage elements. A further object is to provide such a logic system to perform multilevel logical operations without intervening storage elements. A further object is to provide such a logic system which may be used with a plurality of inputs from various sources and which will provide a plurality of outputs to fan out to other points of the system.

It is an object of the invention to provide a logic system for performing *and*, *or* and *not* operations which will permit utilization of a large number of *and* gates. A further object is to provide such a system wherein various combinations of the *and* gates may be utilized separately or concurrently to provide a plurality of different outputs. It is a further object of the invention to provide a logic system which will provide one or more outputs and the complements thereof. A further object is to provide such a logic system which may be utilized and a flip-flop of the delay type and of the set-reset type. A specific object is to provide such a logic system which may produce four-level or higher logical operations separately or in conjunction with the flip-flop operations. A further object is to provide such a logic system in which the *or* capacity can be increased by use of one or more diode *or* gates operated in conjunction with the magnetic gate elements.

It is an object of the invention to provide a logic system including a plurality of magnetic logic gate elements each having an input axis and an output axis, a setup current pulse conductor passing through each of the elements along the output axis thereof, a strobe current pulse conductor passing through each of the elements along the input axis thereof, a plurality of input current pulse conductors with at least one input conductor passing through each of predetermined elements respectively along the input axis thereof providing *and* gates, and with no input conductors passing through one of the elements, an output conductor passing through each of the elements along the output axis thereof with the output conductor of one polarity in the one element and the opposite polarity in the predetermined elements, and an output amplifier with the output conductor coupled to the amplifier as an input thereto.

It is an object of the invention to provide a two-level logic system including a plurality of magnetic logic gate elements each having an input axis and an output axis, a setup current pulse conductor passing through each of the elements along the output axis thereof, a strobe current pulse conductor passing through each of the elements along the input axis thereof, a plurality of input current pulse conductors with at least one input conductor passing through each of predetermined elements respectively along the input axis thereof providing *and* gates for the first logic level, an output conductor passing through each of the elements along the output axis thereof providing an *or* sum for the second logic level, and an output amplifier with the output conductor coupled to the amplifier as an input thereto.

It is an object of the invention to provide a logic system including a plurality of magnetic *and* gate units each having at least one input conductor, an output conductor, and strobe means for generating a pulse on the output conductor when the *and* proposition is satisfied, another magnetic gate unit having an output conductor and means for generating a pulse on the output conductor each time the strobe means is actuated, and means for connecting the output conductors of the plurality of units in series producing an *or* proposition and for connecting the output conductor of the other unit to the interconnected output conductors in the opposite polarity to provide the complement of the *or* proposition.

It is an object of the invention to provide a multilevel logic system including a plurality of magnetic *and* gate units each having input conductors for the inputs of the *and* propositions and a strobe means for generating a pulse on an output conductor when the *and* proposition is satisfied, an output conductor passing through each of the gate units in the same polarity to provide an *or* sum of the *and* propositions in the form $A+B+\ldots+n$, where each letter represents the *and* product of a gate unit, and another conductor passing through the first of said gate units in the said polarity and through the second of said gate units in the opposite polarity to provide the logic operation $A\bar{B}$.

The invention also comprises novel combinations and arrangements of elements together with other objects, advantages, features and results, which will more fully appear in the course of the following description. The drawings merely show and the description merely describes preferred embodiments of the present invention which are given by way of illustration or example.

Figures 1, 2, 4:
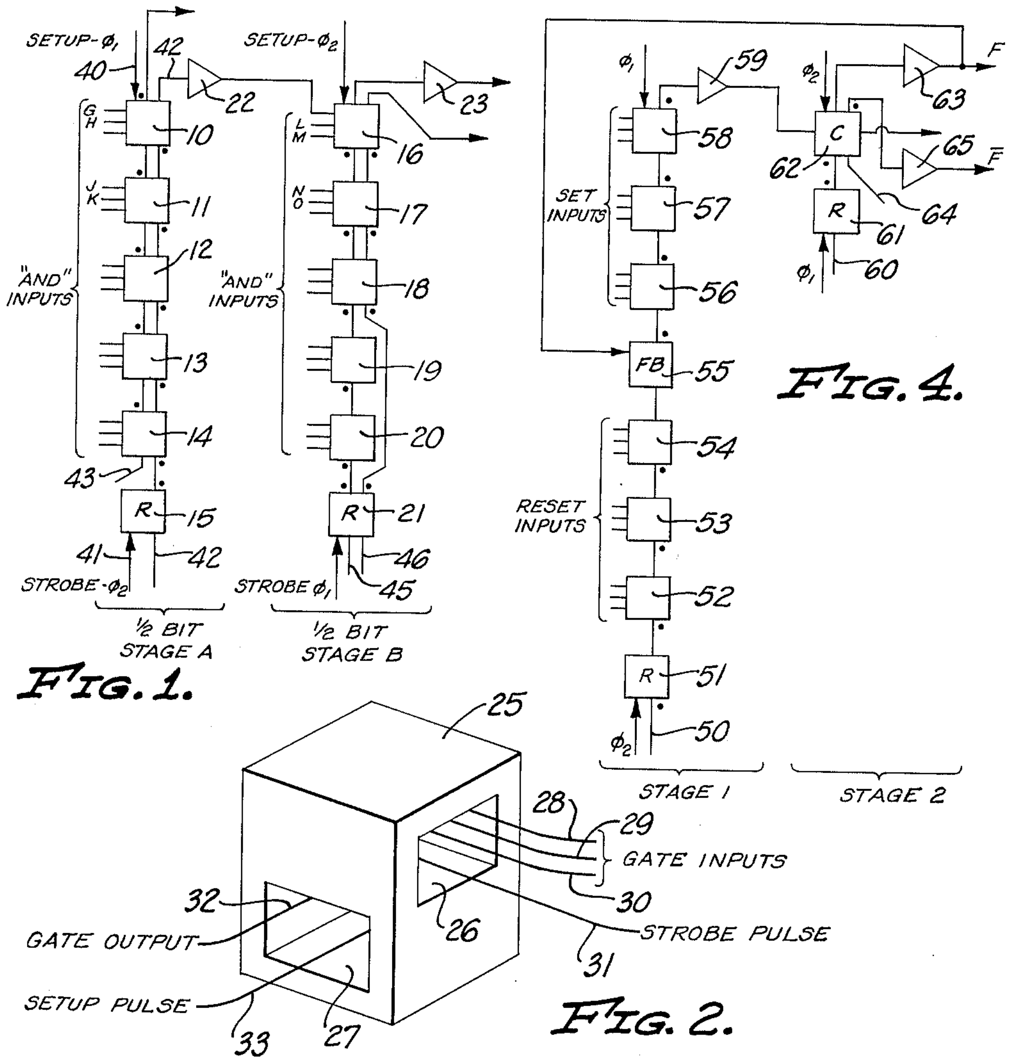
FIG. 1 is a diagram illustrating a preferred arrangement of the multilevel logic system of the invention.
FIG. 2 illustrates one of the magnetic logic gate elements.
FIG. 4 is a diagram of a set-reset flip-flop incorporating the invention.

The logic system of FIG 1 will perform the four-level logic *and-or-and-or* operation. The system includes a plurality of magnetic logic gate elements 10–21 and logic unit amplifiers 22, 23. The basic decision functions of *and, or* and *not,* are performed by flux switching and inhibiting within the individual magnetic elements and storage is performed by a residual flux condition within the magnetic elements.

A typical magnetic logic gate element is shown in FIG. 2 and includes a block 25 of magnetic material having openings 26, 27 passing therethrough perpendicular to each other. One or more gate input conductors 28, 29, 30 and a strobe pulse conductor 31 are positioned in the opening 26. A gate ouput conductor 31 and a setup pulse conductor 33 are positioned in the opening 27. The details of design and operation of this magnetic element are set out in the copending application of Woods, Serial No. 45,022, filed July 25, 1960, and now U.S. Patent No. 3,060,321, and will not be repeated herein. In general, current pulses are alternately applied to the setup pulse conductor 33 and the strobe pulse conductor 31. A current pulse on one or more of the gate input conductors 28, 29, 30 concurrent with the pulse on the setup conductor 33 will inhibit flux change about the opening 26 so that the following pulse on the strobe conductor 31 produces no flux change and no output on the output conductor 32. The absence of any pulse on the gate input conductors 28, 29, 30 during the setup pulse results in an output on the output conductor 32 during the strobe pulse. Hence, the magnetic element functions as an *and* gate, with no current on an input conductor being a true input and current on the output representing a true *and* proposition.

The amplifiers 22, 23 (FIG. 1) are conventional in design. An amplifier provides power gain and decoupling between adjacent stages of the magnetic elements. It also functions as a buffer or pulse former to maintain the desired pulse shape throughout the system. The amplifier is gated to be on during the strobe pulse time of the preceding magnetic elements and is polarized to receive input pulses of one polarity only.

Figure 3:
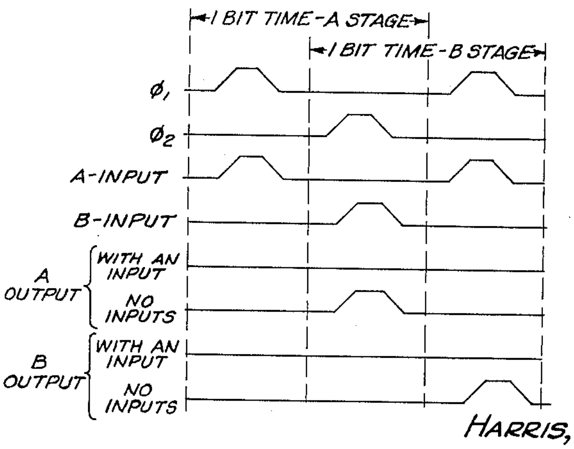
FIG 3 is a timing diagram for the operation of the logic system.

In the system of FIG. 1, the magnetic elements 10–15 provide the first *and-or* operation and are designated as stage A. The elements 16–21 provide the second *and-or* operation and are designated as stage B. These stages are identical in construction and operation and may be operated with a single pair of clock pulses $\phi 1$, $\phi 2$ as shown in FIG. 3, to complete the four-level logic in one bit time. In stage A of FIG. 1, a setup conductor 40 is passed through the opening 27 of each of the elements 10–15. A strobe conductor 41 is passed through the openings 26 of each of the elements. An output conductor 42 is passed through each of the openings 27 and is connected as an input to the amplifier 22. One or more *and* input conductors are positioned in the openings 26 of each of the elements 10–14, depending upon the particular logic operation being performed. Another output conductor 43 may be passed through the opening 27 of each of the elements 10–14. A consistent convention for polarities is used throughout this application, but of course, it is understood that such convention is arbitrary and may be varied to provide the desired logical operation. A false *and* input is represented by a current pulse and a true *and* input by no current. Similarly, an amplifier input or output following an *and-or* operation provides a current pulse for a false proposition and no current for a true proposition. The black dot convention for transformers is used in conjunction with the output windings to indicate the relative polarity of an output conductor in the magnetic elements.

The output or sense conductor 43 provides for *oring* of the *and* propositons of the gate elements 10–14. If the *and* propositons of the respective gates are designated A, B, C, D and E, the conductor 43 produces, in logical notation, the output $A+B+C+D+E$. Of course, the system is not restricted to five *and* gates and each *and* gate is not restricted to three inputs, the number of gates and inputs in any specific application being dependent upon the particular operation being performed.

The *and-or* operation performed with the conductor 43 produces an inversion in polarity, i.e., a no current true input results in a current true output, which complicates the use of the circuitry in complex systems. The logic system of the present invention provides a uniform polarity arrangement by being able to produce the complement of entire logical expressions. The magnetic element 15, sometimes referred to as the reference element, has no *and* inputs. Also, the output conductor 42 is passed through the reference element in a polarity opposite to that which it passes through the elements having *and* inputs. The reference element generates a pulse signal on the output conductor 42 with each strobe pulse. The signal on the conductor 42 is also an *and-or* operation but is the complement of that appearing on the conductor 43, $\cdot\overline{A+B+C+D+E}$.

In the operation of the stage A of FIG. 1, a true or no current input to all of the input conductors of one of the *and* gates will generate a pulse output on the *or* output conductor 43. This can be referred to as a positive output pulse. The reference element 15 will generate a positive pulse on the output conductor 42 while, for this input condition, the other element 10–14 will generate a negative pulse. Hence, for a true *and-or* proposition, a zero amplitude signal will be provide at the amplifier 22. The negative pulse from the *and* gate element will cancel the positive pulse from the reference element. In the absence of a pulse output from each of the elements 10–14, i.e., each *and* gate proposition being false, the reference element will produce a positive output pulse at the amplifier 22 to provide the necessary signal to turn the amplifier on which produces a current output or false condition.

Stated differently, presence of a current on an *and* input conductor is false, while the absence of current denotes a true condition. The presence of a current on an *and* input conductor inhibits setup of the particular element and during the following stroke time, this element produces no output. The absence of an input current allows the element to be set up and an output is obtained during the readout or strobe period. The reference element generates an output during each strobe period and will energize the amplifier unless one of the serially connected elements 10–14 is also producing an output pulse. An output from one of these elements cancels the reference element output as the output conductor is wired in phase opposition. Thus, when each *and* gate element has a current or false input, the output from the reference element energizes the amplifier and produces a false output. However, if one *and* gate element in the string is true having no current input, an output will be obtained from that element to cancel the output from the reference element so that the amplifier is not energized. This is equivalent to a true output.

The output from the amplifier 22 is connected as one of the input conductors to the element 16 of the stage B system. Other inputs are also connected to this stage for a second *and-or* operation, providing the four-level *and-or-and-or* operation at the output of the amplifier 23. The setup conductor of stage A can be directly connected to the strobe conductor of stage B and the strobe conductor of stage A can be directly connected to the setup conductor of stage B, thereby requiring only two clock pulse sources for the two-stage system. A complete pulse diagram for this operation is shown in FIG. 3.

The logic system of FIG. 1 may be used in conjunction with a number of similar systems to provide any desired operation. The amplifiers may be designed to produce an output pulse with sufficient drive capability to drive a plurality of input conductors for fanning out into other logical operations. Also, the inputs to the magnetic elements of FIG. 1 may come from the amplifiers of similar systems. Also, outputs having varying characteristics may be obtained from a single system. For example, the output conductor 45 provides an *or* combination of the *and* elements 16–20 while the output conductor 46 provides an *or* combination only of the *and* elements 16, 17, 18.

In a specific example of an operation carried out with the system of FIG. 1, inputs G and H are provided to element 10, inputs J and K to element 11, inputs L and M to element 16 and inputs N and O to element 17. Then the output of amplifier 23 represents the operation $(GH+JK)LM+NO$.

FIG. 4 illustrates a set-reset flip-flop constructed according to the teaching of the invention. A plurality of magnetic logic gate elements and amplifiers are connected in a manner similar to that of FIG. 1. In stage 1, the output conductor 50 passes through the reference element 51 and a number of elements 52, 53, 54, identified as reset elements, in the same polarity, and through a feedback element 55 and a number of elements 56, 57, 58, identified as set elements, in the opposite polarity, to provide an input to the amplifier 59. In stage 2, an output conductor 60 passes through the reference element 61 in one polarity and through another element 62, identified as the controlled element, in the opposite polarity to provide an input to the amplifier 63 which produces one flip-flop output, called the F output. Another output conductor 64 passes through the controlled element 62 in polarity opposite to the conductor 60 and provides an input to the amplifier 65 which produces the complement of the output of the amplifier 63, identified as the $\overline{F}$ output. The output of the amplifier 59 is connected to the input conductor of the controlled element 62 and the output of the amplifier 63 is connected to the input conductor of the feedback element 55.

Referring first to stage 2, if the controlled element 62 is set to generate an output pulse, the F amplifier 63 receives no pulse since the output pulse from the controlled element cancels the pulse generated by the reference element 61. The F amplifier 65 receives an output pulse since it is connected directly to the controlled element 62. If the controlled element is not set to produce a pulse output, then only the F amplifier 63 is energized since the pulse from the reference element is not cancelled.

Referring to stage 1, the feedback element 55 produces a pulse output when a flip-flop is true. A complete definition of the set-reset is given in the truth table, Table I.

TABLE I

*Set-reset truth table*

| "n" Time | | "n+1" Time |
|---|---|---|
| Set | Reset | F Output |
| 0 | 0 | $F^n$ |
| 0 | 1 | 0 |
| 1 | 0 | 1 |
| 1 | 1 | (*) |

*Predictable—If the number of true set terms exceed the number of true reset terms, then the flip-flop assumes the 1 state. If the number of true reset terms exceed the number of true set terms, the flip-flop assumes the 0 state. If the number of true set terms equal the true reset terms, the flip-flop retains its present state.

When the set and reset elements are both false, denoted by 0 in the table, the output from the reference element 51 will energize the amplifier 59 unless the feedback element 55 also produces a pulse output. Thus, if the flip-flop output is true at time "*n*," it will be regenerated by feedback to the feedback element. This generates a pulse output from the feedback element which cancels the output from the reference element 51 and, hence, produces a true output from the amplifier 59 of stage 1. This condition is merely delayed in stage 2 so that the true output is regenerated at time "*n*+1." If the flip-flop output is false at "*n*," the feedback element 55 is inhibited and, hence, the output of reference element 51 is not cancelled. This energizes the amplifier of stage 1 and produces a false output to the controlled element 62. A one or true condition is set into the flip-flop by setting one of the set elements true to cancel the reference element output. A zero or false input is set into this element by setting one of the reset elements true. A pulse output is then obtained from the reset element to add to the reference element output and, hence, override the output obtained from the feedback element. This will energize the stage 1 amplifier producing a false output.

Figures 5, 6:
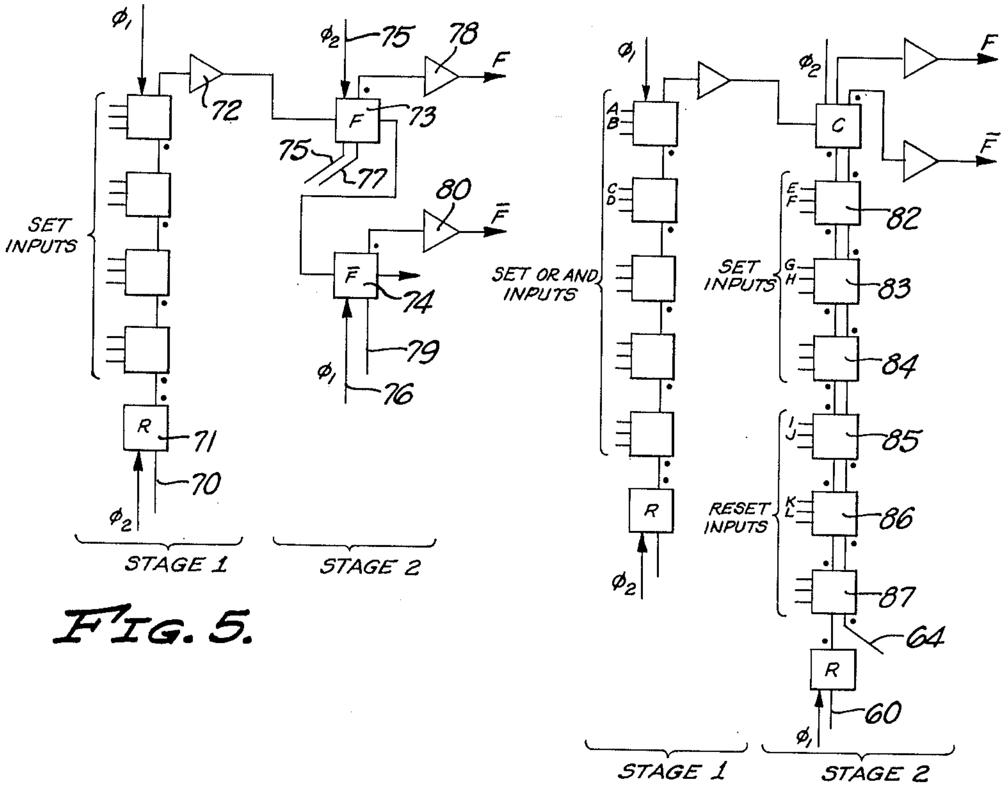
FIG. 5 is a diagram of a delay flip-flop incorporating the invention.
FIG. 6 is a diagram of another embodiment of delay flip-flop incorporating the invention.

A delay flip-flop constructed according to the teaching of the invention is shown in FIG. 5. Stage 1 is similar to stage A of FIG. 1 with the output conductor 70 passing through the reference element 71 in one polarity and the remaining elements in the opposite polarity to provide an input to the amplifier 72. The output from stage 1 is connected as an input to both elements 73, 74 of stage 2 and may be in series as shown in FIG. 5 or in parallel. In stage 2, the set conductor 75 passes only through the element 73 while the strobe conductor 76 passes through both elements 74 and 73. An output conductor 77 passes through the element 73 to the F output amplifier 78. Another output conductor 79 passes through the element 74 to the $\overline{F}$ amplifier 80. In this arrangement, the output from stage 1 inhibits one of the elements of stage 2 and switches the other. When stage 1 produces an output, it inhibits the setup clock from setting the F element 73 and sets the $\overline{F}$ element 74. Then during the readout or strobe interval, only the $\overline{F}$ amplifier 80 is energized. When stage 1 does not produce an output, only the F element 73 is set by the set pulse on the conductor 75. The truth table for the delay flip-flop is set out in Table II.

TABLE II

*Delay truth table*

| "n" time | "n+1" time |
|---|---|
| Set | F Output |
| 0 | 0 |
| 1 | 1 |

It should be noted that stage 2 of the set-reset flip-flop of FIG. 4 can be substituted for stage 2 of the delay flip-flop of FIG. 5. Similarly, stage 2 of the delay flip-flop can be substituted for stage 2 of the set-reset flip-flop.

FIG. 6 illustrates another embodiment of the invention suitable for carrying out four-level logical operations. In this embodiment, stage 1 is similar to stage 1 of FIG. 5 and stage 2 is similar to stage 2 of FIG. 4 with additional elements 82–87 connected in series with the output conductors 60, 64, permitting additional logical inputs at the third level. The embodiment shown in FIG. 6 may function as a delay flip-flop. It can be converted to a set-reset flip-flop by addition of a feedback element in stage 1 in the manner shown in FIG. 4.

In a specific example of an operation of the flip-flop of FIG. 6 with inputs A, B, C, D, E, F, G, H, I, J, K and L, as indicated on the drawing, the set and reset terms are:

$$\text{SET}=(AB+CD)\phi_1+(EF+GH)\phi_2$$
$$\text{RESET}=(IJ+KL)\phi_2$$

The capability of the logic system can be extended through the use of diodes. A plurality of *or* strings, such as stage 1 of FIG. 6, can be connected as inputs to a conventional diode *or* gate with the output being connected to the amplifier. The logic system may utilize ten or more magnetic gate elements on an *or* string or output conductor. However, occasionally logical operations require considerable in excess of this figure and the logic system of the invention is completely compatible with diode gates.

Figure 7:
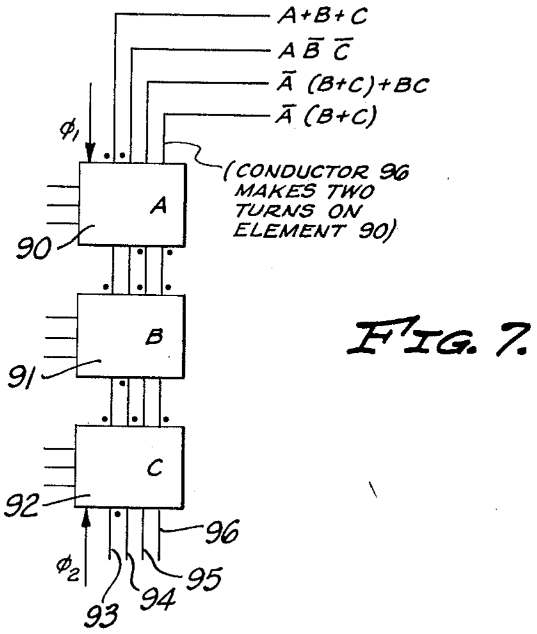
FIG. 7 is a diagram illustrating an alternative arrangement of the invention.

FIG. 7 illustrates the position of a plurality of outputs from a single string of the magnetic logic gate elements, here shown as three elements 90, 91, 92 with conventional input, setup and strobe conductors and with output conductors 93, 94, 95, 96. In this example, the logical *and* expressions for the individual *and* gates are represented by the letters A, B, C, respectively.

The output or sense conductor 93 passes through each of the elements with the same polarity producing the logical *or* sum $A+B+C$. The conductor 94 passes through the element 90 in the same polarity and through the elements 91, 92 in the reverse polarity producing the function $A\bar{B}\bar{C}$. With the output conductor 95 passing through elements 91 and 92 series aiding and through element 90 in the opposite polarity, the equation $$\bar{A}(B+C)+BC$$

is obtained. By weighting the output of the *and* proposition from element 90 with twice the number of turns used on the elements 91 and 92, the output of the conductor 96 becomes $\bar{A}(B+C)$. Various other *and*, or and *not* expressions can be obtained by suitably arranging the output conductor or conductors, with the resultant series string being used in the stages of the multilevel logic systems previously described.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a logic system, the combination of:
a plurality of magnetic logic gate elements, each of said elements having an input axis and an output axis;
a setup current pulse conductor passing through each of said elements along the output axis thereof;
a strobe current pulse conductor passing through each of said elements along the input axis thereof;
a plurality of input current pulse conductors, with at least one input conductor passing through each of predetermined elements respectively along the input axis thereof providing *and* gates, and with no input conductors passing through one of said elements;
an output conductor winding passing through each of said elements along the output axis thereof, with said output conductor of one polarity being wound in one direction in said one element and the opposite polarity being wound in the opposite direction in said predetermined elements;
and an output amplifier, with said output conductor coupled to said amplifier as an input thereto.

2. In a logic system, the combination of:
a plurality of magnetic logic gate elements, each of said elements having an input axis and an output axis, with said elements divided into a first group and a second group;
a first setup current pulse conductor passing through each of the elements of said first group along the output axis thereof;
a first strobe current pulse conductor passing through each of the elements of said first group along the input axis thereof;
a second setup current pulse conductor passing through each of the elements of said second group along the output axis thereof and connected to said first strobe conductor;
a second strobe current pulse conductor passing through each of the elements of said second group along the input axis thereof and connected to said first setup conductor;
a plurality of input current pulse conductors, with at least one input conductor passing through each of predetermined elements respectively along the input axis thereof providing *and* gates, and with no input conductors passing through one of the elements of said first group and one of the elements of said second group;
a first output conductor winding passing through each of the elements of said first group along the output axis thereof, with said output conductor of one polarity being wound in one direction in said one element and the opposite polarity being wound in the opposite direction in said predetermined elements;
a second output conductor winding passing through each of said elements of said second group along the output axis thereof, with said output conductor of one polarity being wound in one direction in said one element and the opposite polarity being wound in the opposite direction in said predetermined elements;
a first output amplifier, with said first output conductor coupled to said amplifier as an input thereto and with said amplifier output coupled to one of the input conductors of said second group;
and a second output amplifier, with said second output conductor coupled to said amplifier as an input thereto.

3. In a multilevel logic system, the combination of:
a plurality of magnetic *and* gate units, each of said units having input conductors for the inputs of the *and* propositions, and a strobe means for generating a pulse on an output conductor when the *and* proposition is satisfied;
an output conductor winding passing through each of said gate units to provide a first logic operation of the *and* products;
and another output conductor winding passing through two of said gate units in the same polarity being wound in the same direction and through a third of said gate units in the opposite polarity being wound in the opposite direction and with double the turns in said two units to provide the operation $\bar{A}(B+C)$, where each letter represents the *and* product of a unit.

4. In a logic system for providing an *and-or* proposition and the complement thereof, the combination of:
a plurality of magnetic logic gate elements, each of said elements having an input axis and an output axis;
a setup current pulse conductor passing through each of said elements along the output axis thereof;
a strobe current pulse conductor passing through each of said elements along the input axis thereof;
a plurality of input current pulse conductors, with at least one input conductor passing through each of predetermined elements respectively along the input axis thereof providing *and* gates, and with no input conductors passing through one of said elements;
a first output conductor winding passing through each of said predetermined elements along the output axis thereof providing an *or* sum of the *and* gates;
and a second output conductor winding passing through each of said elements along the output axis thereof, with said output conductor of one polarity being wound in one direction in said one element and the opposite polarity being wound in the opposite direction in said predetermined elements providing the complement of said *or* sum.

5. In a multilevel logic system, the combination of:
a plurality of magnetic *and* gate units, each of said units having input conductors for the inputs of the *and* propositions, and a strobe means for generating a pulse on an output conductor when the *and* proposition is satisfied;
an output conductor winding passing through two of of said gate units in the same polarity being wound in the same direction and through a third gate unit in the opposite polarity being wound in the opposite direction to provide the operation $A\bar{B}\bar{C}$, where each letter represents the *and* product of a gate unit;
and another output conductor winding passing through said two units in a polarity opposite to said one conductor being wound in the opposite direction and through said third unit in a polarity opposite to said one conductor being wound in the opposite direction and with double the turns in said first two units to provide the operation $\bar{A}(B+C)$.

6. In a two-level *and-or* logic system having a pulse for false and no-pulse for true, the combination of:

a plurality of magnetic logic gate elements, each of said elements having an input axis and an output axis;

a setup current pulse conductor passing through each of said elements along the output axis thereof;

a strobe current pulse conductor passing through each of said elements along the input axis thereof;

means for sequentially coupling current pulses to said setup and strobe conductors;

a plurality of input current pulse conductors, with at least one input conductor passing through each of predetermined elements respectively along the input axis thereof providing *and* gates, and with no input conductors passing through one of said elements;

an output conductor winding passing through each of said elements along the output axis thereof, with said output conductor of one polarity being wound in one direction in said one element and the opposite polarity being wound in the opposite direction in said predetermined elements providing the complement of an *or* gate;

and an output amplifier, with said output conductor coupled to said amplifier as an input thereto, with a pulse on an input conductor of an element setting a flux about the output axis thereof for producing a pulse on said output conductor when a pulse is applied to said strobe conductor with the inputs to an element producing an *and* product at said output conductor and with the *and* products producing an *or* sum at said amplifier.

7. In a logic system, the combination of:

a plurality of magnetic *and* gate units, each of said units having at least one input conductor, an output conductor winding being wound in one direction, and strobe means for generating a pulse on the output conductor when the *and* proposition is satisfied;

another magnetic gate unit having an output conductor winding being wound in the opposite direction to said *and* gate output conductor winding and means for generating a pulse on the output conductor each time the strobe means is actuated;

and means for connecting the output conductors of said plurality of units in series producing an *or* proposition, and for connecting the output conductor of said other unit to said interconnected output conductors in the opposite polarity to provide the complement of the *or* proposition.

8. In a set-reset flip-flop logic system, the combination of:

a plurality of magnetic *and* gate units, each of said units having at least one input conductor, an output conductor, and strobe means for generating a pulse on the output conductor when the *and* proposition is satisfied, with said plurality of units including at least one set unit, a feedback unit, and at least one reset unit;

a first reference magnetic gate unit having an output conductor and means for generating a pulse on the output conductor each time the strobe means is actuated;

a first output amplifier;

means for connecting the output conductors of said set, feedback, reset and first reference units in series as an input to said first amplifier, with said set and feedback conductors of the same polarity and said reset and first reference conductors of the opposite polarity;

a controlled magnetic gate unit having an input conductor, first and second output conductors, and another strobe means for generating pulses on the output conductors when an input pulse has not been received;

a second reference magnetic gate unit having an output conductor and means for generating a pulse on the output conductor each time said other strobe means is actuated;

second and third output amplifiers;

means for connecting the output of said first amplifier to the input conductor of said controlled unit;

means for connecting one output conductor of said controlled unit and the output conductor of said second reference unit in series opposition as an input to said second amplifier;

means for connecting the second output conductor of said controlled unit as an input to said third amplifier and in opposite polarity to said first output conductor;

and means for connecting the output of said second amplifier to the input conductor of said feedback unit.

9. In a set-reset flip-flop logic system, the combination of:

a plurality of magnetic *and* gate units, each of said units having at least one input conductor, an output conductor, and strobe means for generating a pulse on the output conductor when the *and* proposition is satisfied, with said plurality of units including at least one set unit, a feedback unit, and at least one reset unit;

a first reference magnetic gate unit having an output conductor and means for generating a pulse on the output conductor each time the strobe means is actuated;

a first output amplifier;

means for connecting the output conductors of said set, feedback, reset and first reference units in series as an input to said first amplifier, with said set and feedback conductors of the same polarity and said reset and first reference conductors of the opposite polarity;

first and second controlled magnetic gate units each having an input conductor, an output conductor, and another strobe means for generating a pulse on the output conductor when an input pulse has not been received;

second and third output amplifiers;

means for connecting the output of said first amplifier to the input conductors of said controlled units;

means for connecting the output conductor of said first controlled unit as an input to said second amplifier;

means for connecting the output conductor of said second controlled unit as an input to said third amplifier;

and means for connecting the output of said second amplifier to the input conductor of said feedback unit.

10. In a flip-flop logic system, the combination of:

a plurality of magnetic *and* gate units, each of said units having at least one input conductor, an output conductor, and strobe means for generating a pulse on the output conductor when the *and* proposition is satisfied;

a first output amplifier;

means for connecting the output conductors of said plurality of units in series as an input to said first amplifier;

a controlled magnetic gate unit having an input conductor, first and second output conductors, and another strobe means for generating pulses on the output conductors when an input pulse has not been received;

a reference magnetic gate unit having an output conductor and means for generating a pulse on the output conductor each time said other strobe means is actuated;

second and third output amplifiers;

means for connecting the output of said first amplifier to the input conductor of said controlled unit;

means for connecting one output conductor of said controlled unit and the output conductor of said reference unit in series opposition as an input to said second amplifier;

and means for connecting the second output conductor of said controlled unit as an input to said third amplifier and in opposite polarity to said first output conductor.

11. In a set-reset flip-flop logic system, the combination:

a plurality of magnetic *and* gate units, each of said units having at least one input conductor, an output conductor, and strobe means for generating a pulse on the output conductor when the *and* proposition is satisfied;

a first output amplifier;

means for connecting the output conductors of said plurality of units in series as an input to said first amplifier;

first and second controlled magnetic gate units, each having an input conductor, an output conductor, and another strobe means for generating a pulse on the output conductor when an input pulse has not been received;

second and third output amplifiers;

means for connecting the output of said first amplifier to the input conductors of said controlled units;

means for connecting the output conductor of said first controlled unit as an input to said second amplifier;

and means for connecting the output conductor of said second controlled unit as an input to said third amplifier.

12. In a set-reset flip-flop logic system, the combination of:

a plurality of magnetic logic gate elements, each of said elements having an input axis and an output axis, with said elements divided into a first group and a second group, with said first group including at least one set element, a feedback element, at least one reset element, and a first reference element, and with said second group including a controlled element and a second reference element;

a first setup current pulse conductor passing through each of the elements of said first group along the output axis thereof;

a first strobe current pulse conductor passing through each of the elements of said first group along the input axis thereof;

a second setup current pulse conductor passing through each of the elements of said second group along the output axis thereof and connected to said first strobe conductor;

a second strobe current pulse conductor passing through each of the elements of said second group along the input axis thereof and connected to said first setup conductor;

a plurality of input current pulse conductors, with at least one input conductor passing through each of said set, feedback, reset and controlled elements respectively along the input axis thereof providing *and* gates, and with no input conductors passing through said reference elements;

a first output conductor passing through each of the elements of said first group along the output axis thereof, with said output conductor of one polarity in said set and feedback elements and the opposite polarity in said reset and first reference elements;

a second output conductor passing through each of said elements of said second group along the output axis thereof, with said output conductor of one polarity in said controlled element and the opposite polarity in said second reference element;

a third output conductor passing through said controlled element along the output axis thereof and in opposite polarity to said second output conductor;

a first output amplifier, with said first output conductor coupled to said amplifier as an input thereto and with said amplifier output coupled to an input conductor of said controlled element;

a second output amplifier, with said second output conductor coupled to said amplifier as an input thereto;

a third output amplifier, with said third output conductor coupled to said amplifier as an input thereto;

and means for connecting the output of said second amplifier to an input conductor of said feedback element.

13. In a set-reset flip-flop logic system, the combination of:

a plurality of magnetic logic gate elements, each of said elements having an input axis and an output axis, with said elements divided into a first group and a second group, with said first group including at least one set element, a feedback element, at least one reset element, and a reference element, and with said second group including first and second controlled elements;

a first setup current pulse conductor passing through each of the elements of said first group along the output axis thereof;

a first strobe current pulse conductor passing through each of the elements of said first group along the input axis thereof;

a second setup current pulse conductor passing through said first controlled element along the output axis thereof and connected to said first strobe conductor;

a second strobe current pulse conductor passing through each of the elements of said second group along the input axis thereof and connected to said first setup conductor;

a plurality of input current pulse conductors, with at least one input conductor passing through each of said set, feedback, reset and controlled elements respectively along the input axis thereof providing *and* gates, and with no input conductors passing through said reference element;

a first output conductor passing through each of the elements of said first group along the output axis thereof, with said output conductor of one polarity in said set and feedback elements and the opposite polarity in said reset and reference elements;

a second output conductor passing through said first controlled element along the output axis thereof;

a third output conductor passing through said second controlled element along the output axis thereof;

a first output amplifier, with said first output conductor coupled to said amplifier as an input thereto and with said amplifier output coupled to an input conductor of said controlled elements;

a second output amplifier, with said second output conductor coupled to said amplifier as an input thereto;

a third output amplifier, with said third output conductor coupled to said amplifier as an input thereto;

and means for connecting the output of said second amplifier to an input conductor of said feedback element.

14. In a flip-flop logic system, the combination of:

a plurality of magnetic logic gate elements, each of said elements having an input axis and an output axis, with said elements divided into a first group and a second group, with said second group including a controlled element and a reference element;

a first setup current pulse conductor passing through each of the elements of said first group along the output axis thereof;

a first strobe current pulse conductor passing through each of the elements of said first group along the input axis thereof;

a second setup current pulse conductor passing through each of the elements of said second group along the output axis thereof and connected to said first strobe conductor;

a second strobe current pulse conductor passing through each of the elements of said second group along the input axis thereof and connected to said first setup conductor;

a plurality of input current pulse conductors, with at least one input conductor passing through each of the elements of said first group and said controlled element respectively along the input axis thereof providing *and* gates, and with no input conductors passing through said reference elements;

a first output conductor passing through each of the elements of said first group along the output axis thereof;

a second output conductor passing through each of said elements of said second group along the output axis thereof, with said output conductor of one polarity in said controlled element and the opposite polarity in said reference element;

a third output conductor passing through said controlled element along the output axis thereof and in opposite polarity to said second output conductor;

a first output amplifier, with said first output conductor coupled to said amplifier as an input thereto and with said amplifier output coupled to an input conductor of said controlled element;

a second output amplifier, with said second output conductor coupled to said amplifier as an input thereto;

and a third output amplifier, with said third output conductor coupled to said amplifier as a input thereto.

15. In a flip-flop logic system, the combination of:

a plurality of magnetic logic gate elements, each of said elements having an input axis and an output axis, with said elements divided into a first group and a second group, with said second group including first and second controlled elements;

a first setup current pulse conductor passing through each of the elements of said first group along the output axis thereof;

a first strobe current pulse conductor passing through each of the elements of said first group along the input axis thereof;

a second setup current pulse conductor passing through said first controlled element along the output axis thereof and connected to said first strobe conductor;

a second strobe current pulse conductor passing through each of the elements of said second group along the input axis thereof and connected to said first setup conductor;

a plurality of input current pulse conductors, with at least one input conductor passing through each of said elements respectively along the input axis thereof providing *and* gates;

a first output conductor passing through each of the elements of said first group along the output axis thereof;

a second output conductor passing through said first controlled element along the output axis thereof;

a third output conductor passing through said second controlled element along the output axis thereof;

a first output amplifier, with said first output conductor coupled to said amplifier as an input thereto and with said amplifier output coupled to an input conductor of said controlled elements;

a second output amplifier, with said second output conductor coupled to said amplifier as an input thereto;

and a third output amplifier, with said third output conductor coupled to said amplifier as an input thereto.

16. In a set-reset flip-flop logic system, the combination of:

a plurality of magnetic *and* gate units, each of said units having at least one input conductor, an output conductor, and strobe means for generating a pulse on the output conductor when the *and* proposition is satisfied, with said plurality of units including at least one set unit; a feedback unit, and at least one reset unit;

a first reference magnetic gate unit having an output conductor and means for generating a pulse on the output conductor each time the strobe means is actuated;

a first output amplifier;

means for connecting the output conductors of said set, feedback, reset and first reference units in series as an input to said first amplifier, with said set and feedback conductors of the same polarity and said reset and first reference conductors of the opposite polarity;

magnetic storage means having an input and two outputs for generating output signals correspondnig to the input signal and the complement thereof when actuated by a strobe means subsequent in time to the strobe means of said gate units;

second and third output amplifiers;

means for connetcing the output of said first amplifier as an input signal to said magnetic storage means;

means for connecting one output signal of said storage means as an input to said second amplifier;

means for connecting the complement output signal of said storage means as an input to said third amplifier;

and means for connecting the one output signal of said storage means to the input conductor of said feedback unit.

17. In a multilevel logic system, the combination of:

a plurality of magnetic *and* gate units, each of said units having input conductors for the inputs of the *and* propositions, and a strobe means for generating a pulse on an output conductor when the *and* proposition is satisfied;

an output conductor winding passing through each of said gate units in the same polarity being wound in the same direction to provide an *or* sum of the and proposition in the form $A+B+\ldots+n$, where each letter represents the *and* product of a gate unit;

and another conductor winding passing through the first of said gate units in said polarity being wound in said same direction and through the second of said gate units in the opposite polarity being wound in the opposite direction to provide the logic operation $A\overline{B}$.

References Cited by the Examiner

UNITED STATES PATENTS

Publication I: Digital Computer Principles, by Wayne C. Irwin, chapters 11, 12, 16 and 17, copyright 1960.

Publication II: Arithmetic Operations in Digital Computers, by R. K. Richards, chapters 2, 3 and 4, copyright 1955.

Pages 40–54, Aug. 31, 1959, Publication III, Wanlass, C. L. and Wanlass S. D., "Biax High Speed Magnetic Computer Element," IRE-Wescon Convention Record, vol. 3, part 4.

IRVING L. SRAGOW, *Primary Examiner.*

JOHN F. BURNS, *Examiner.*

R. J. McCLOSKEY, H. DONALD VOLK, *Assistant Examiners.*